United States Patent
Keller

(10) Patent No.: US 8,839,767 B2
(45) Date of Patent: Sep. 23, 2014

(54) RELIEF VALVE AND FUEL VAPOR VALVE ASSEMBLY

(75) Inventor: Robert Dean Keller, Davisburg, MI (US)

(73) Assignee: Eaton Corporation, Cleveland, OH (US)

( * ) Notice: Subject to any disclaimer, the term of this patent is extended or adjusted under 35 U.S.C. 154(b) by 625 days.

(21) Appl. No.: 13/165,083

(22) Filed: Jun. 21, 2011

(65) Prior Publication Data

US 2012/0024265 A1 Feb. 2, 2012

Related U.S. Application Data

(60) Provisional application No. 61/368,797, filed on Jul. 29, 2010.

(51) Int. Cl.

| F02M 33/02 | (2006.01) |
|---|---|
| F16K 31/06 | (2006.01) |
| B60K 15/035 | (2006.01) |
| F16K 24/04 | (2006.01) |
| F16K 1/54 | (2006.01) |
| B60K 15/03 | (2006.01) |

(52) U.S. Cl.
CPC ... *F16K 31/0655* (2013.01); *B60K 2015/03296* (2013.01); *B60K 2015/03302* (2013.01); *B60K 15/03519* (2013.01); *B60K 2015/03276* (2013.01); *F16K 24/04* (2013.01); *F16K 1/54* (2013.01); *B60K 2015/03514* (2013.01)
USPC .................. 123/520; 251/129.07; 251/129.15; 251/282

(58) Field of Classification Search
USPC ......... 123/516–520; 251/129.07, 129.15, 282
See application file for complete search history.

(56) References Cited

U.S. PATENT DOCUMENTS

| 5,277,167 | A | * | 1/1994 | DeLand et al. ............... 123/518 |
|---|---|---|---|---|
| 5,429,099 | A | * | 7/1995 | DeLand ........................ 123/520 |
| 5,524,662 | A | | 6/1996 | Benjey et al. |
| 5,640,993 | A | | 6/1997 | Kasugai et al. |
| 5,970,958 | A | * | 10/1999 | DeLand et al. ............... 123/520 |
| 6,058,913 | A | * | 5/2000 | Busato et al. ................. 123/520 |
| 7,011,077 | B2 | | 3/2006 | Veinotte |
| 7,121,267 | B2 | * | 10/2006 | Perry et al. ..................... 123/516 |
| 8,272,399 | B2 | * | 9/2012 | Farrow et al. ............ 137/601.02 |
| 2002/0079472 | A1 | * | 6/2002 | Kumar ...................... 251/129.07 |
| 2009/0133672 | A1 | | 5/2009 | Crisan |
| 2009/0294712 | A1 | * | 12/2009 | Hutchings et al. ........ 251/129.15 |

FOREIGN PATENT DOCUMENTS

WO 9001651 A1 2/1990

OTHER PUBLICATIONS

PCT Search Report dated Jan. 2, 2012 for PCT/IB2011/001765 filed Jul. 29, 2011.

* cited by examiner

*Primary Examiner* — Erick Solis
(74) *Attorney, Agent, or Firm* — Mei & Mark LLP

(57) ABSTRACT

A valve assembly is provided that can perform an overpressure relief function to vent fluid from a first component, such as to vent fuel vapor from a fuel tank, to a second component, such as a carbon canister, without being affected by the vapor pressure in the vent line to the second component. That is, the valve opens to provide pressure relief when needed regardless of the vapor pressure against which it opens. The valve assembly may also include a solenoid that is controllable to allow fluid flow separately from the movement in response to vapor pressure.

20 Claims, 3 Drawing Sheets

RELIEF VALVE AND FUEL VAPOR VALVE ASSEMBLY

CROSS-REFERENCE TO RELATED APPLICATIONS

This application claims the benefit of U.S. Provisional Application No. 61/368,797, filed Jul. 29, 2010, which is hereby incorporated by reference in its entirety.

TECHNICAL FIELD

The invention relates to a valve assembly for controlling fluid flow between two components, especially for controlling the flow of fuel vapor between a fuel tank and a vapor absorbing carbon canister.

BACKGROUND

Vapor vent valves are used in various applications to allow vapor to vent from a container under predetermined conditions. For example, fuel vapor is vented to a carbon canister that absorbs the fuel vapor. The carbon canister is later purged of the vapor, which is then burned in the vehicle engine.

Typically, vapor vent valves are configured to block the flow of vapor from the fuel tank to the canister until a predetermined pressure of the vapor in the tank acts on the valve. The force on the vent valve due to the pressure of the vapor in the fuel tank will overcome the force of a spring biasing the vent valve to a closed position. Under those conditions, the vent valve performs an overpressure relief function. Some vapor vent valves also perform an overvacuum relief function by opening to allow vapor to flow from the vent line back into the tank when the pressure of the tank falls below a predetermined minimum pressure.

SUMMARY

A valve assembly is provided that performs an overpressure relief function to vent fluid from a first component, such as to vent fuel vapor from a fuel tank, to a second component, such as a carbon canister, without being affected by the vapor pressure in the vent line to the second component. That is, the valve assembly has a valve that opens to provide pressure relief when needed regardless of the vapor pressure against which it opens. The valve assembly may also include a solenoid that is controllable to allow fluid flow separately from the movement in response to vapor pressure.

Specifically, a valve assembly for controlling fluid flow between a first port and a second port includes a valve body defining a passage between the first port and the second port. As used herein, fluid flow includes vapor flow, liquid flow, or both. The valve assembly includes an electrically-energizable solenoid having a movable armature. At least one valve is connected for movement with the armature in the valve body. The at least one valve may include both a first valve, such as a poppet valve connected for movement with the armature, and a second valve, referred to herein as a sealing valve, that substantially surrounds the poppet valve. The at least one valve (e.g., the poppet valve and the sealing valve together) blocks the passage when in a seated position. The at least one valve unblocks the passage when moved by the armature of the solenoid valve in response to energizing (or, in some embodiments, deenergizing) the solenoid.

The at least one valve can also move independently of the solenoid from the seated position to the unseated position. The at least one valve is exposed to a first pressure on a side of the at least one valve exposed to the first port and a second pressure on an opposing side of the at least one valve exposed to the second port. A diaphragm valve is operatively connected for movement with the at least one valve and has an effective area exposed to the second pressure equal to an effective area of the at least one valve exposed to the second pressure. The force of the pressure at the second port on the diaphragm valve is substantially equal and opposite to the force of the pressure at the second port on the sealing valve. The force of the second pressure on the diaphragm valve substantially cancels the effect of the substantially equal and opposite force of the second pressure on the at least one valve. Movement of the at least one valve to an unseated position to open the passage in response to the first pressure at the first port being above a predetermined pressure is thereby substantially independent of the second pressure.

Accordingly, in a fuel tank application, the valve assembly performs an over-pressure relief function by opening to allow venting without regard to the pressure at the second port (e.g., without regard to pressure in the vapor vent line to the canister). The valve assembly may also include a first spring that biases the at least one valve to the seated position so that overpressure relief occurs when the force of the pressure at the first port (e.g., at the fuel tank) is greater than the force due to the first spring.

Optionally, in an embodiment in which the at least one valve includes a poppet valve and the sealing valve, the poppet valve may also be movable against the force of a second spring when the sum of the force on the poppet valve due to vapor pressure at the second port and a force on the diaphragm valve due to another pressure on an opposing side of the diaphragm valve than the side that the second pressure acts on is greater than the sum of the force of the second spring, the force on the poppet valve due to pressure at the first port, and a force on the diaphragm valve due to pressure at the second port. In a fuel tank application, the poppet valve thereby performs an overvacuum relief function by permitting vapor flow from the canister vent line to the fuel tank when the first pressure in the fuel tank falls below a predetermined minimum pressure.

The above features and advantages and other features and advantages of the present invention are readily apparent from the following detailed description of the best modes for carrying out the invention when taken in connection with the accompanying drawings.

DETAILED DESCRIPTION

Figure 1:
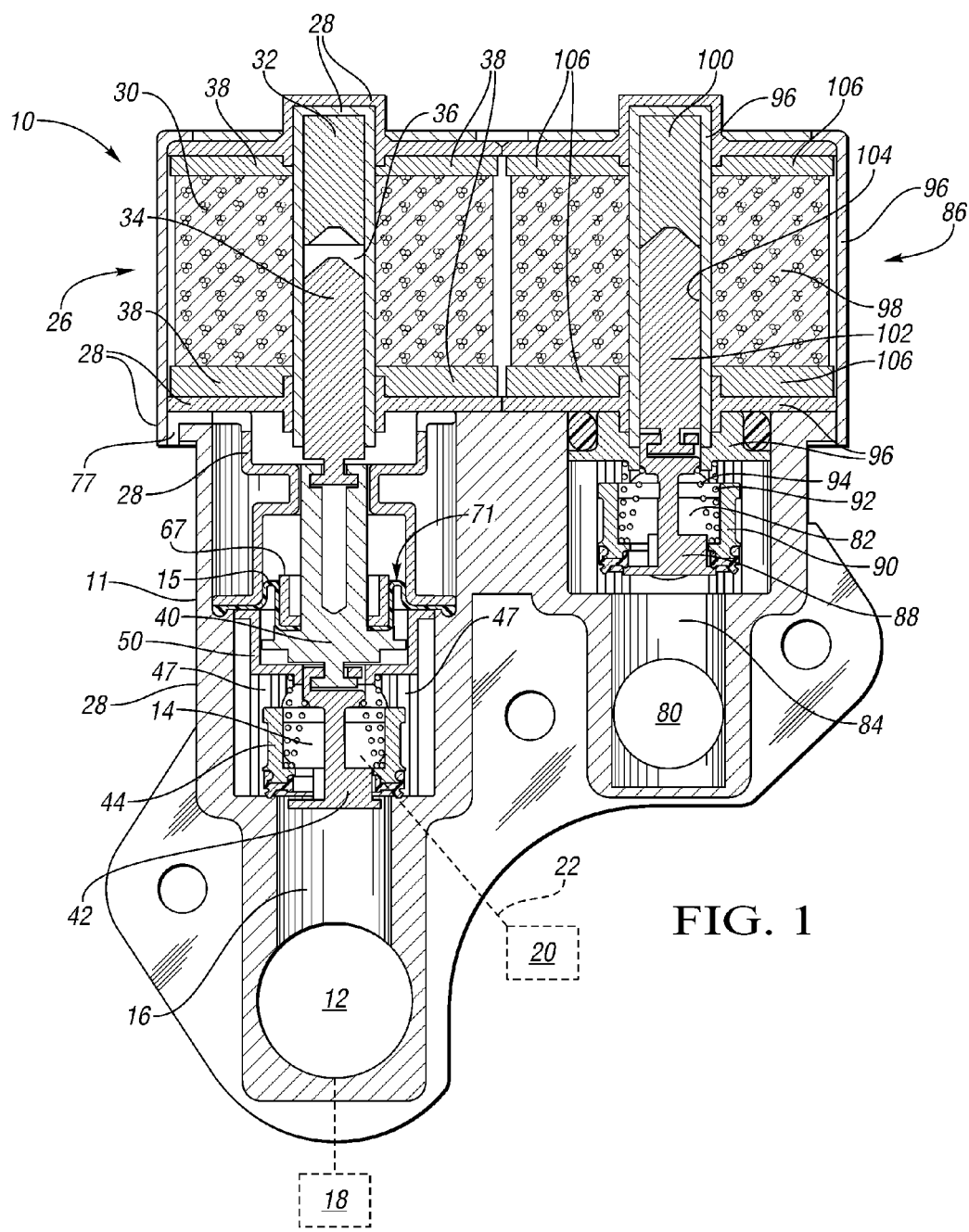
FIG. 1 is a schematic cross-sectional illustration of a valve assembly controlling vapor flow between a fuel tank and a vapor canister.

Referring to the drawings, wherein like reference numbers refer to like components throughout the several views, FIG. 1, shows a valve assembly 10 with a valve body 11 that has a first port 12, a second port 14, and a passage 16 connecting the first port 12 with the second port 14. As further described below, a diaphragm valve 15 is used to affect the balance of forces on valves in the valve assembly 10.

The valve assembly 10 controls fluid flow between the first port 12 and the second port 14 as described herein. In one non-limiting embodiment, the valve assembly 10 is for use on a vehicle for controlling the flow of vapors between a fuel tank 18 and a vapor canister 20. FIG. 1 illustrates the fuel tank 18 as being operatively connected to the first port 12 so that a first pressure at the first port 12 is the pressure in the fuel tank 18 and a second pressure at the second port 14 is the pressure in a line 22 connecting the vapor canister 20 to the second port 14. In other embodiments, the fuel tank 18 could be connected with the second port 14 and the line 22 to the vapor canister 20 could be connected with the first port 12.

The valve assembly 10 includes a first solenoid 26 with a solenoid body 28. In the embodiment shown, the solenoid body 28 is also referred to as a valve housing and is a multi-piece component with pieces that may be made integral or made unitary with one another by casting, molding, or other processes. The solenoid body 28 surrounds a coil 30. A pole piece 32 is press-fit or otherwise secured within the solenoid body 28. An armature 34 is movable within a columnar cavity 36 when the coil 30 is energized by an electric source (such as a battery, not shown). Flux collectors 38 are positioned adjacent the armature 34. The pole piece 32, coil 30, armature 34 and flux collectors 38 form an electromagnet. Lines of flux are created in an air gap between the pole piece 32 and the armature 34.

Figure 2:
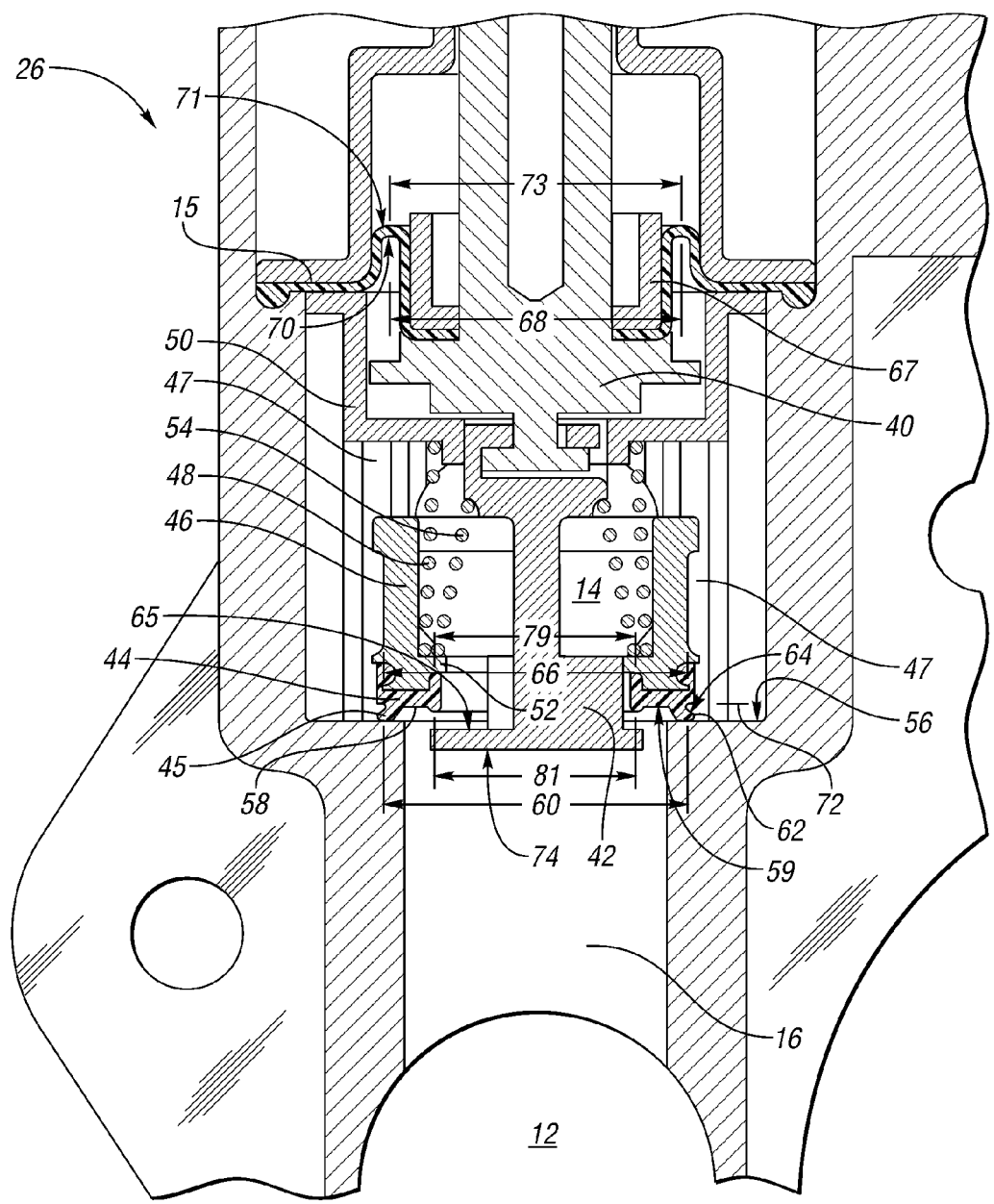
FIG. 2 is a schematic cross-sectional illustration of a portion of the valve assembly of FIG. 1.

An extension 40 is connected for movement with the armature 34. A poppet valve 42, also referred to herein as a first valve or as a first poppet valve, is connected for movement with the extension 40 and the armature 34. The valve assembly 10 also includes a sealing valve 44 that radially surrounds the poppet valve 42. The sealing valve 44 is also referred to as a second valve. The poppet valve 42 and the sealing valve 44 could be integrated as a single valve. In such an embodiment, the valve assembly 10 would not provide the overvacuum relief function described below, as the poppet valve 42 must be able to move independently of the sealing valve 44 to provide over-pressure relief. In FIG. 2, the sealing valve 44 is shown in a seated position in which it is in contact with a seating surface 56 of the valve body 11 at the passage 16. The sealing valve 44 includes both a flexible seal portion 45 and a relatively more rigid body portion 46.

In FIG. 1, the armature 34 is shown in a position in which the coil 30 is not energized. In an alternative embodiment, the armature 34 may be configured to be in the position shown in FIG. 1 when the coil 30 is energized, and can move toward the pole piece 32 when the coil 30 is deenergized. In a first position, the poppet valve 42 is level with the seating surface 56 on which the sealing valve 44 is seated, to prevent flow between the first port 12 and the second port 14. In the embodiment of FIG. 1, when the coil 30 is energized, the armature 34 will move toward the pole piece 32, pulling the poppet valve 42 upward in FIGS. 1 and 2 to a second position in which the poppet valve 42 also pulls the sealing valve 44 upward, so that the sealing valve 44 and the poppet valve 42 are above the seating surface 56 of the valve body 11. This opens the passage 16 to allow flow between the first port 12 and the second port 14. Movement of the sealing valve 44 is guided by ridges 47.

The solenoid 26 may be controlled by a controller when powered, such as when a vehicle that the valve is used on is being operated. The valve assembly 10 also provides for overpressure and overvacuum relief in response to the forces of vapor pressure regardless of whether or not the vehicle is being operated, i.e., even when a controller for the solenoid 26 is not powered. In the embodiment shown, in which the poppet valve 42 and the sealing valve 44 are not integrated as a single valve, when the armature 34 is in the position shown, the poppet valve 42 can also move independently of the sealing valve 44 between the first position and the third position shown (toward the first port 12) depending on the balance of forces on the poppet 42 due to pressures at the first port 12 and the second port 14, forces on the diaphragm valve due to pressures at the second port and pressure on a side of the diaphragm valve opposite the side exposed to the second port, and the biasing force of the spring 54. In FIGS. 1 and 2, the poppet valve 42 is shown in the third position in which it permits vapor flow from the second port 14 to the first port 12. The third position occurs during conditions that create an overvacuum situation, and is explained further herein.

A first spring 48, shown in FIG. 2, biases the sealing valve 44 to the seated position shown. The first spring 48 is seated in contact with a stationary portion 50 of the valve body 11 and an inner annular lip 52 of the sealing valve 44. The first spring 48 radially surrounds a second spring 54. The second spring 54 is in contact with a portion of the poppet valve 42 and the lip 52 of the sealing valve 44. The first spring 48 is an outer spring and the second spring 54 is an inner spring.

The sealing valve 44 has a first side or surface 58 with a first effective area 59 that is exposed to the first pressure at the port 12. The first effective area 59 is an area created by the surfaces of the sealing valve 44 and the poppet valve 42 exposed to the first pressure. The first effective area 59 is equivalent to the area of a circle with an outer diameter 60. An opposite, second side or surface 62 of the sealing valve 44 has a second effective area 64 and with a second effective diameter 66 that is exposed to the second pressure at port 14. The surface 64 is created by the surfaces of the sealing valve 44 and the poppet valve 42 exposed to the second pressure.

When the poppet valve 42 is in a first position in which its inner surface 65 contacts the sealing valve 44 and the sealing valve 44 is in the seated position shown, the passage 16 is blocked by the poppet valve 42 and the sealing valve 44 and fluid flow between the first port 12 and the second port 14 is not permitted. If pressure at the first port 12 rises above a predetermined level, in order for the sealing valve 44 to open (i.e., move to the unseated position) the force of the first pressure on the first effective area 59 will need to overcome the force of the first spring 48 that biases the sealing valve 44 to the seated position.

Due to the offsetting effect of the diaphragm valve 15, the sealing valve 44 need not overcome any force due to the second pressure at the second port 14 in order to lift to the unseated position. The diaphragm valve 15 is anchored at an outer periphery to the stationary valve body 11 between the valve body 11 and the stationary solenoid body 28. At an inner periphery, the diaphragm valve 15 is connected to move with the armature 34, and the valve extension 40 and first poppet valve 42 connected for movement with the armature 34. The diaphragm valve 15 is connected to a cup flange 67 that extends from and moves with the extension 40. The extension 40 and the cup flange 67 may be integrated as a single component. The diaphragm valve 15 is configured with a surface 70 with a third effective area and an effective diameter 68 exposed to the second pressure at the second port 14. A surface 71 with a fourth effective area of the diaphragm valve 15 on an opposite side of the diaphragm valve 15 than the surface 70 with the third effective area and is exposed to another pressure, such as but not limited to atmospheric pressure, via an opening 77 (shown in FIG. 1) in the valve housing 28. The surface 71 with the fourth effective area is at a side of the diaphragm valve 15 that has an effective diameter 73.

The diaphragm valve 15 is specifically configured so that the surface 70 with the third effective area of the diaphragm valve 15 exposed to the second pressure is equal to the second effective area of the surface 64 of the poppet valve 42 and the sealing valve 44 exposed to the second pressure. The effective diameter 68 is equal to the effective diameter 66. Thus, the force of the second pressure at the second port 14 acting on the sealing valve 44 to move the sealing valve 44 toward the first port 12 is offset by the opposite force of the second pressure on the diaphragm valve 15 acting to move the diaphragm valve 15 (and thus the extension 40 and sealing valve 44) away from the surface 56, to an unseated position. In other words, because of the diaphragm valve 15, the second pressure at the second port 14 has no effect on the position of the sealing valve 44. The only pressures affecting movement of the sealing valve 44 to the unseated position are the pressure at the first port 12 on surface 59 and the pressure on the surface 71 (which may be atmospheric pressure). Another embodiment may be configured to adjust the effective diameter of the diaphragm valve 15 equal to effective diameter 79 instead of effective diameter 60 or could be adjusted in between depending upon the application.

Unless overdriven by the solenoid 26 to place the poppet valve 42 in the second (open) position, and except in the overvacuum state, the positions of the poppet valve 42 and the sealing valve 44 depend on the resultant forces of pressure at the first port 12 and the forces of the springs 48, 54 acting on the valves 42, 44. With respect to the sealing valve 44 and the poppet valve 42, the force of the first pressure at the first port 12 (which is the product of the first pressure and the first effective area 59) less the force of the spring 48 acts to lift the poppet valve 42 and the sealing valve 44 away from the surface 56 toward the second port 14 to allow fluid flow between the ports 12, 14. The force of the first spring 48 acts to bias the sealing valve 44 to the surface 56 (i.e., to the seated position shown). The poppet valve 42 is also biased to the first position in which the surface 65 of the poppet valve 42 contacts the first side 58 of the flexible seal portion 45. The second pressure at the second port 14 has no affect on the sealing valve 44. Accordingly, the sealing valve 44 will lift to an unseated position in which the bottom of the flexible seal portion 45 is at position 72 to allow fluid flow when the force of the first pressure at the first port 12 exceeds the force of the spring 48. That is, the forces acting to unseat the sealing valve 44 are:

$P_{First} * A_{First} - F_{First\ Spring}$, where $P_{First}$ is the pressure at the first port 12, $A_{First}$ is the first effective area 59, and $F_{First\ Spring}$ is the force of the first spring 48.

With respect to the poppet valve 42, assuming that the solenoid 26 is not operated to move the armature 34 (and thereby both the poppet valve 42 and the sealing valve 44) away from the first port 12 to open the passage 16, then the balance of forces on the poppet valve 42 include the force of the inner spring 54 which biases the poppet valve 42 to a closed position in which the surface 65 contacts the first side 58 with the sealing valve 44 in the seated position shown. The force of the first pressure at the first port 12 is the product of the first pressure and the effective area 74 of the surface exposed to the first pressure, and also acts to bias the poppet valve 42 to the closed position. In opposition to the force of the spring 54 and the force of the first pressure at the first port 12, the force of the second pressure at the second port 14 is the product of the second pressure acting against the effective area of the surface 65 exposed to the second pressure. That is, the forces acting to move the poppet valve 42 to the third position as shown to provide overvacuum relief are:

$P_{Second} * A_{Poppet\ Second} + P_{Third} * A_{Diaphragm\ at\ Third\ Pressure} - (P_{First} * A_{Poppet\ First} + F_{Second\ Spring} + P_{Second} * A_{Diaphragm\ at\ Second\ Pressure})$, where $P_{Second}$ is the second pressure at the second port 14, $Area_{Poppet\ Second}$ is the area of surface 65 exposed to the second pressure, having an effective diameter 79, $A_{Diaphragm\ at\ Third\ Pressure}$ is the effective area of surface 71 of the diaphragm 15 exposed to a third pressure $P_{Third}$ and having an effective diameter 73, $P_{First}$ is the pressure at the first port 12, $A_{Poppet\ First}$ is the area 74 exposed to the first pressure and having an effective diameter 81, $F_{Second\ Spring}$ is the force of the second spring 54, and $A_{Diaphragm\ at\ Second\ Pressure}$ is the effective area of surface 70 of the diaphragm 15 exposed to the second pressure and having an effective diameter 68.

Accordingly, when the sum of the force of the second pressure at the second port 14 acting against the surface 65 and the force of the third pressure acting on the surface 71 of the diaphragm 17 is greater than the sum of the force of the first pressure acting against the area 74, the force of the spring 54, and the force of the second pressure acting on the area 70 of the diaphragm 15, the poppet valve 42 moves to the third position shown to allow fluid flow from the second port 14 to the first port 12. In the embodiment shown, this allows vapor flow from the line 22 to the fuel tank 18, such as when the first pressure falls below a predetermined minimum pressure to provide overvacuum relief. In embodiments where the first pressure at the first port 12 is the pressure in line 22 and the second pressure at the second port 14 is the pressure in the fuel tank 18, then the overvacuum relief of the valve 42, 44 will be balanced due to the diaphragm so that the second pressure has minimal effect on the overvacuum relief function.

In FIG. 1, the valve body 11 also forms an optional third port 80, a fourth port 82, and a second passage 84 that connects the third port 80 with the fourth port 82. A second solenoid 86, a third valve 88, and a fourth valve 90, as well as a third spring 92 and a fourth spring 94 are used to control fluid flow between the third port 80 and the fourth port 82 as described herein. The third port 80 may be in fluid communication with the fuel tank 18, and the fourth port 82 may be in fluid communication with the vent line 22 to the vapor canister 20. The valves 88, 90 and springs 92, 94 may be configured to provide overpressure and overvacuum relief at different pressure levels than the valves 42, 44 and springs 48, 54. Alternatively, the third port 80 may be configured to be in fluid communication with the vent line 22 and the fourth port 82 may be configured to be in fluid communication with the fuel tank 18. Still further, the third port 80 and the fourth port 82 may be in fluid communication with different components than those with which the first port 12 and the second port 14 are in fluid communication.

The solenoid 86 has a multipiece solenoid body 96 that surrounds a coil 98. The solenoid body 96 may be integrally formed or unitary with the solenoid body 28. A pole piece 100 is press-fit or otherwise secured within the solenoid body 96. An armature 102 is movable within a columnar cavity 104 when the coil 98 is energized by an electric source (such as a battery, not shown). Flux collectors 106 are positioned adjacent the armature 102. The pole piece 100, coil 98, armature 102 and flux collectors 106 form an electromagnet. Lines of flux are created in an air gap between the pole piece 100 and the armature 102.

Figure 3:
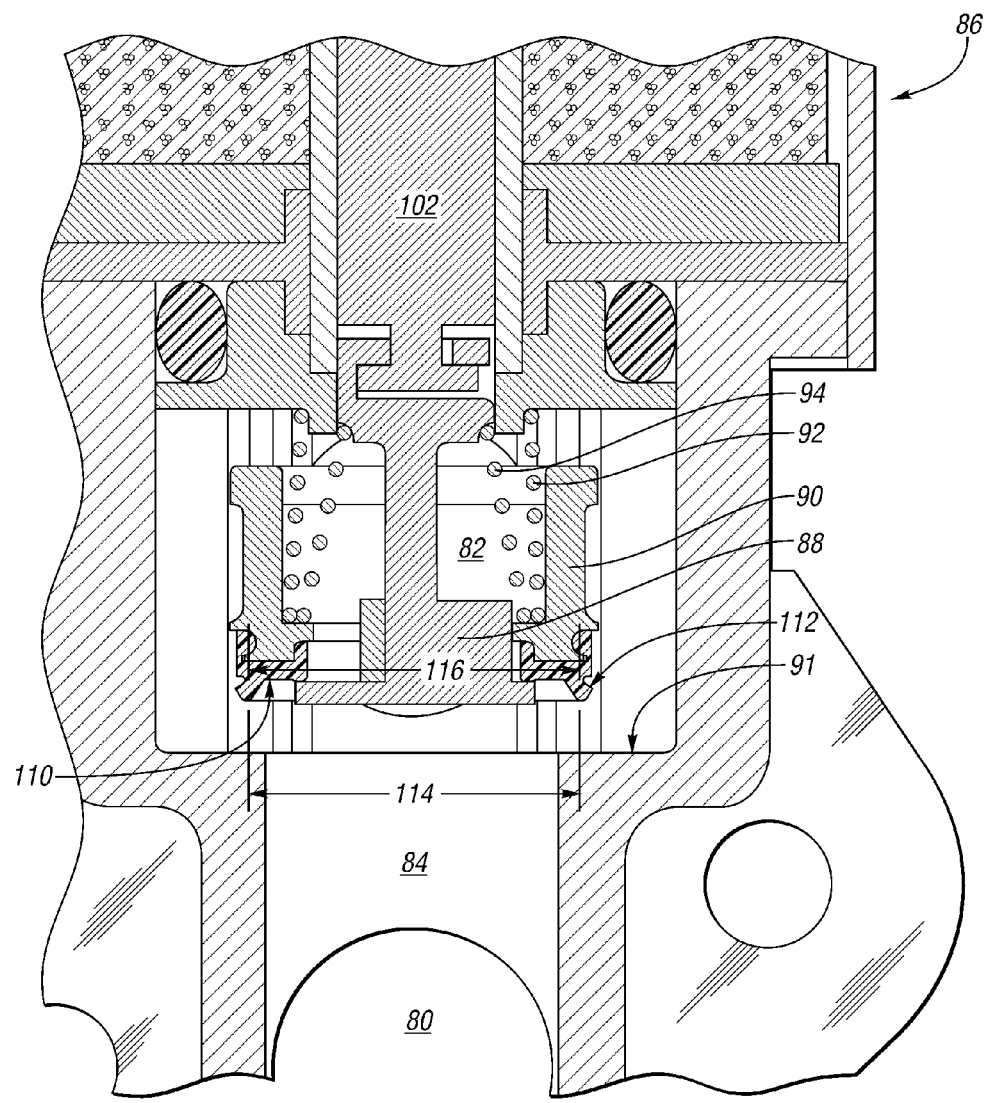
FIG. 3 is a schematic cross-sectional illustration of another portion of the valve assembly of FIG. 1.

The third valve 88, also referred to as a second poppet valve, is connected for movement with the armature 102. The armature 102 is shown in an open position in which it has moved toward the pole piece 100, either due to the coil 98 being energized (or, in some embodiments, deenergized) or due to the overpressure relief function of the valves 88, 90, permitting fluid communication between the ports 80, 82 through the passage 84. In an alternative embodiment, the armature 102 may be configured to be in the open position allowing flow between ports 80 and 82 when the coil 98 is not energized, and can move to block flow when the coil 98 is energized. In the case of such a normally-open solenoid (i.e., where the armature is in a position to allow flow between the ports 80, 82 when the coil 98 is not energized), the overpressure relief and the overvacuum relief would function only when the solenoid is energized. In the embodiment of FIG. 3, when the coil 100 is not energized, the armature 102 will move away from the pole piece 100, moving the poppet valve 88 downward in FIGS. 1 and 3 to a closed position, also allowing the fourth valve 90 to move downward, so that the fourth valve 90 is seated at surface 91, and the fourth valve 90 and the poppet valve 88 block the passage 84 to prevent flow between the third port 80 and the fourth port 82.

The solenoid 86 may be controlled by a controller when powered, such as when a vehicle with the valve assembly 10 is being operated. The valve assembly 10 also provides for overpressure and overvacuum relief using the spring-biased valves 88, 90, movable in response to the forces of vapor pressure regardless of whether or not the vehicle is being operated, i.e., even when a controller for the solenoid 86 is not powered (in an embodiment in which the solenoid is normally closed). In the embodiment shown, when the armature 102 is not pulled toward the pole piece 100 by the solenoid 86, overpressure relief is provided when the sealing valve 90 is moved to the unseated position shown, with the poppet valve 88 also moving to the open position shown, to allow vapor flow from the third port 80 to the fourth port 82.

Overpressure relief will occur when the force of the pressure at the third port 80 on a surface of the sealing valve 90 seated at the surface 91 with a fourth effective area 110 and an effective diameter 114 is greater than the sum of the opposing force of the pressure at the fourth port 82 on a surface of the sealing valve 90 with a fifth effective area 112 having an effective diameter 116 and the force of the spring 92 on the sealing valve 90. The fourth effective area 110 of the sealing valve 90 is the area of a circle with an effective diameter 114 and includes the area of both the sealing valve 90 and the poppet valve 88 exposed to the pressure at the third port 80. The fifth effective area 112 of the sealing valve 90 is the area of a circle with an effective diameter 116 and includes the area of both the sealing valve 90 and the poppet valve 88 exposed to the pressure at the fourth port 82.

Similarly, the poppet valve 88 can also move between a closed position it is in when the sealing valve 90 is in the seated position, and a position (toward the port 80) to provide overvacuum relief. Assuming the sealing valve 90 is in the seated position, when the force of the pressure at the port 82 on the surface with the fifth effective area 112 exceeds the sum of the force of the pressure at the port 80 on the surface with the fourth effective area 110 and the force of the spring 94, the poppet valve 88 moves to a position toward the port 80 to allow fluid flow from the port 82 to the port 80.

While the best modes for carrying out the invention have been described in detail, those familiar with the art to which this invention relates will recognize various alternative designs and embodiments for practicing the invention within the scope of the appended claims.

The invention claimed is:

1. A valve assembly, comprising:
    a valve body comprising a first port, a second port, and a passageway connecting the first port to the second port, wherein the passageway further comprises a seating surface;
    a first valve in the passageway, the first valve comprising a seal and a poppet, wherein the seal is movable between a seated position and an unseated position against the seating surface in the passageway, and wherein the poppet is movable among a lifted position, where the poppet lifts the seal to fluidly connect the first port to the second port, a sealed position, where the poppet seals against the seal and the seal is in the seated position, and a lowered position, where the poppet unseals from the seal to fluidly connect the first port to the second port; and
    a solenoid in the valve body, the solenoid comprising an armature connected to move at least the poppet when the solenoid is energized.

2. The valve assembly of claim 1, wherein the valve body further comprises a diaphragm above the first valve, the diaphragm configured to receive fluid pressure from the second port.

3. The valve assembly of claim 1, wherein:
    the seal further comprises a first side facing the second port, the first side comprising a first effective diameter, and a second side facing the first port, the second side comprising a second effective diameter; and
    the poppet further comprises a third side facing the second port, the third side comprising a third effective diameter, and a fourth side facing the first port, the fourth side comprising a fourth effective diameter,
    when a first pressure at the first port reaches a first predetermined value, the first pressure at the first port acts on the fourth side to lift the poppet to the lifted position.

4. The valve assembly of claim 3, wherein, when a second pressure at the second port reaches a second predetermined value, the second pressure acts on the first side of the seal to seat the seal in the seated position.

5. The valve assembly of claim 4, wherein the valve body further comprises a diaphragm above the first valve, the diaphragm comprising a fifth side comprising a fifth effective diameter, the fifth side configured to receive the second pressure from the second port, and wherein the fifth effective diameter, the third effective diameter, and the first effective diameter are configured such that the force of the second pressure acting on the third effective diameter and on the first effecting diameter offsets the force of the second pressure acting on the fifth effective diameter.

6. The valve assembly of claim 5, wherein the diaphragm further comprises a sixth side configured to receive a third pressure.

7. The valve assembly of claim 2, wherein the first port is configured to supply fluid of a first pressure to the seal and to the poppet, wherein the diaphragm receives the fluid pressure from the second port on a first side of the diaphragm, and wherein the valve body further comprises a third port configured to supply a fluid of a third pressure to a second side of the diaphragm.

8. The valve assembly of claim 1, wherein the armature further comprises an extension, and wherein the extension connects the armature to the poppet.

9. The valve assembly of claim 8, wherein the valve body further comprises a diaphragm above the first valve, and wherein the extension passes through the diaphragm.

10. The valve assembly of claim 1, wherein the seal comprises a flexible seal portion and a rigid body portion.

11. The valve assembly of claim 10, wherein the valve body further comprises:
   a first spring abutting the poppet on a first end and abutting the rigid body portion of the seal on a second end; and
   a second spring abutting a portion of the valve body on a third end and abutting the rigid body portion of the seal on a fourth end,
   wherein the first spring biases the poppet to the sealed position, and
   wherein the second spring biases the seal to the seated position.

12. The valve assembly of claim 1, wherein the valve body further comprises ridges configured to guide the movement of the seal.

13. The valve assembly of claim 1, wherein the valve body further comprises a third port, a fourth port and a second passageway connecting the third port to the fourth port, wherein the second passageway further comprises a second seating surface;
   a second valve in the second passageway, the second valve comprising a second seal and a second poppet, wherein the second seal is movable between a seated position and an unseated position against the seating surface in the passageway, and wherein the second poppet is movable among a lifted position, where the second poppet lifts the seal to fluidly connect the first port to the second port, a sealed position, where the second poppet seals against the second seal and the second seal is in the seated position, and a lowered position, where the second poppet unseals from the second seal to fluidly connect the third port to the fourth port; and
   a second solenoid in the valve body, the second solenoid comprising a second armature connected to move at least the second poppet when the second solenoid is energized,
   wherein, when the solenoid is energized, the first valve provides one of an over pressure relief function and an over vacuum relief function and,
   wherein, when the second solenoid is energized, the second valve provides one of an over pressure relief function and an over vacuum relief function.

14. The valve assembly of claim 1, wherein, when the solenoid is energized, the solenoid is configured to lift the poppet to the lifted position.

15. The valve assembly of claim 1, wherein, when the solenoid is energized, the solenoid is configured to lower the poppet to the lowered position.

16. A valve assembly, comprising:
   a valve body comprising a first port connected to a fluid at a first pressure, a second port connected to a fluid at a second pressure, and a passageway connecting the first port to the second port, wherein the passageway further comprises a seating surface;
   a first valve in the passageway, the first valve comprising a seal and a poppet, wherein the seal is movable between a seated position and an unseated position against the seating surface in the passageway, and wherein the poppet is movable among a lifted position, where the poppet lifts the seal in response to the fluid at the first pressure to fluidly connect the first port to the second port, a sealed position, where the poppet seals against the seal and the seal is in the seated position, and a lowered position, where the poppet unseals from the seal to fluidly connect the first port to the second port; and
   a solenoid in the valve body, the solenoid comprising an armature connected to move at least the poppet when the solenoid is energized.

17. The valve assembly of claim 16, wherein:
   the seal further comprises a first side facing the second port, the first side comprising a first effective diameter, and a second side facing the first port, the second side comprising a second effective diameter;
   the poppet further comprises a third side facing the second port, the third side comprising a third effective diameter, and a fourth side facing the first port, the fourth side comprising a fourth effective diameter;
   the valve body further comprises a diaphragm above the first valve, the diaphragm comprising a fifth side comprising a fifth effective diameter; and
   the fifth side is configured to receive the fluid at the second pressure from the second port, and wherein the fifth effective diameter is configured such that the force of the second pressure acting on the fifth effective diameter is offset by the force of the second pressure acting on the third effective diameter and on the first effecting diameter.

18. The valve assembly of claim 17, wherein the diaphragm further comprises a sixth side configured to receive a third pressure.

19. A vapor control system of a vehicle, the vehicle comprising a fuel tank and a carbon canister, the system comprising:
   a valve body comprising a first port connected to the fuel tank, a second port connected to the carbon canister, and a passageway connecting the first port to the second port, wherein the passageway further comprises a seating surface;
   a first valve in the passageway, the first valve comprising a seal and a poppet, wherein the seal is movable between a seated position and an unseated position against the seating surface in the passageway, and wherein the poppet is movable among a lifted position, where the poppet lifts the seal in response to fuel over pressure from the fuel tank, a sealed position, where the poppet seals against the seal and the seal is in the seated position, and a lowered position, where the poppet unseals from the seal in response to a vacuum condition in the fuel tank; and
   a solenoid in the valve body, the solenoid comprising an armature connected to move at least the poppet when the solenoid is energized.

20. The vapor control system of claim 19, wherein the valve body further comprises a diaphragm above the first valve, wherein the diaphragm comprises a first side and a second side, wherein the first side of the diaphragm receives fluid pressure from the carbon canister, and wherein the valve body further comprises a third port exposing the second side of the diaphragm to another fluid pressure.

* * * * *